(12) United States Patent
Converse et al.

(10) Patent No.: US 11,478,987 B2
(45) Date of Patent: Oct. 25, 2022

(54) METHODS AND APPARATUS FOR WASHING OBJECTS PRODUCED BY STEREOLITHOGRAPHY

(71) Applicant: Carbon, Inc., Redwood City, CA (US)

(72) Inventors: Courtney F. Converse, Los Altos, CA (US); W. Ryan Powell, Sunnyvale, CA (US); Sherwood Forlee, Redwood City, CA (US); David Eliot Scheinman, Woodside, CA (US); Scott Heines, San Jose, CA (US); Edwin James Sabathia, Jr., Hollister, CA (US)

(73) Assignee: Carbon, Inc., Redwood City, CA (US)

( * ) Notice: Subject to any disclaimer, the term of this patent is extended or adjusted under 35 U.S.C. 154(b) by 2 days.

(21) Appl. No.: 16/466,535

(22) PCT Filed: Nov. 29, 2017

(86) PCT No.: PCT/US2017/063626
§ 371 (c)(1),
(2) Date: Jun. 4, 2019

(87) PCT Pub. No.: WO2018/111548
PCT Pub. Date: Jun. 21, 2018

(65) Prior Publication Data
US 2020/0078831 A1 Mar. 12, 2020

Related U.S. Application Data

(60) Provisional application No. 62/434,043, filed on Dec. 14, 2016, provisional application No. 62/471,094, filed on Mar. 14, 2017.

(51) Int. Cl.
*B29C 64/35* (2017.01)
*B08B 3/10* (2006.01)
(Continued)

(52) U.S. Cl.
CPC .............. *B29C 64/35* (2017.08); *B08B 3/102* (2013.01); *B08B 3/12* (2013.01); *B29C 64/20* (2017.08)

(58) Field of Classification Search
CPC ....... B29C 64/35; B29C 64/10; B29C 64/134; B29C 71/0009; B29C 2071/0045;
(Continued)

(56) References Cited

U.S. PATENT DOCUMENTS 4,353,381 A * 10/1982 Winters .................. B08B 3/102
134/102.1
5,122,441 A 6/1992 Lawton et al.
(Continued)

FOREIGN PATENT DOCUMENTS

EP 0599585 6/1994
JP H02111528 4/1990
(Continued)

OTHER PUBLICATIONS

Andreas Gebhardt & Jan-Steffen Hotter, Additive Mfg.—3D Printing for Prototyping & Mfg. (Hanser 2016), available at https://app.knovel.com/hotlink/toc/id:kpEGPROF13/additive-manufacturing/additive-manufacturing (Year: 2016).*
(Continued)

*Primary Examiner* — Mikhail Kornakov
*Assistant Examiner* — Richard Z. Zhang
(74) *Attorney, Agent, or Firm* — Myers Bigel, P.A.

(57) ABSTRACT

Method of making a three-dimensional object, comprising the steps of: (a) providing a carrier platform on which the three-dimensional object can be formed; (b) producing the three-dimensional object, (c) immersing the object in a wash liquid with the object remaining adhered to the carrier platform; (d) agitating (i) the object in said wash liquid, (ii) the wash liquid with the object immersed therein, or (iii)
(Continued)

both the object and the wash liquid, to at least partially remove residual resin from the surface of the object; (e) separating the object from the wash liquid, with the object remaining adhered to the carrier platform, (f) agitating the object to at least partially remove residual wash liquid from the surface thereof; and (g) repeating steps (c) through (f) to remove additional polymerizable resin from the surface thereof, wherein steps (c) through (f) are carried out in the same vessel.

8 Claims, 5 Drawing Sheets

(51) Int. Cl.
*B29C 64/20* (2017.01)
*B08B 3/12* (2006.01)

(58) Field of Classification Search
CPC ..... B29C 64/00–40; B08B 3/04; B08B 3/041; B08B 3/042; B08B 3/044; B08B 3/102; B08B 3/12; B08B 3/123; B08B 3/045; B08B 3/047; B08B 3/048; B08B 11/02; B08B 3/00–14; B08B 11/00–04; B08B 3/08; B08B 3/10; B08B 3/104; B08B 3/108; A47L 1/00–25/00; B05B 15/50–58; H01L 21/00–86
See application file for complete search history.

(56) References Cited

U.S. PATENT DOCUMENTS

| | | | |
|---|---|---|---|
| 5,236,637 A | 8/1993 | Hull | |
| 5,248,456 A * | 9/1993 | Evans, Jr. | B29C 64/35 264/401 |
| 5,391,072 A | 2/1995 | Lawton et al. | |
| 5,482,659 A | 1/1996 | Sauerhoefer | |
| 6,288,018 B1 | 9/2001 | Flynn et al. | |
| 6,660,208 B2 | 12/2003 | Hanna | |
| 6,996,245 B2 | 2/2006 | Hanna | |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,404,056 B1 * | 3/2013 | Chen | G05D 7/0635 134/56 R |
| 8,529,703 B2 | 9/2013 | Kabashima et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,343,331 B2 | 7/2019 | McCall et al. | |
| 10,471,656 B2 | 11/2019 | McCall et al. | |
| 10,596,755 B2 | 3/2020 | Desimone et al. | |
| 10,618,215 B2 | 4/2020 | Desimone et al. | |
| 2002/0092547 A1 * | 7/2002 | You | B08B 3/00 134/36 |
| 2002/0159917 A1 * | 10/2002 | Swart | A61C 19/002 422/20 |
| 2002/0161460 A1 * | 10/2002 | Noguchi | B08B 3/04 700/90 |
| 2007/0175496 A1 | 8/2007 | Rattray | |
| 2007/0179655 A1 * | 8/2007 | Farnworth | B33Y 30/00 700/114 |
| 2007/0204480 A1 * | 9/2007 | Gray | B08B 3/08 34/410 |
| 2008/0087298 A1 * | 4/2008 | Katou | B08B 3/12 134/1 |
| 2011/0089610 A1 | 4/2011 | El-Siblani et al. | |
| 2012/0195994 A1 | 8/2012 | El-Siblani et al. | |
| 2013/0034411 A1 | 2/2013 | David et al. | |
| 2013/0292862 A1 | 11/2013 | Joyce | |
| 2013/0295212 A1 | 11/2013 | Chen et al. | |
| 2014/0178588 A1 | 6/2014 | Swanson et al. | |
| 2015/0331402 A1 | 11/2015 | Lin et al. | |
| 2015/0360419 A1 | 12/2015 | Willis et al. | |
| 2016/0059270 A1 * | 3/2016 | Chen | B08B 3/02 134/111 |
| 2017/0129167 A1 | 5/2017 | Castanon | |
| 2017/0129169 A1 | 5/2017 | Batchelder et al. | |
| 2019/0126547 A1 | 5/2019 | Desimone et al. | |
| 2019/0389127 A1 | 12/2019 | Desimone et al. | |
| 2020/0047406 A1 | 2/2020 | McCall et al. | |
| 2020/0139617 A1 | 5/2020 | Desimone et al. | |

FOREIGN PATENT DOCUMENTS

| | | |
|---|---|---|
| WO | 96/28535 | 9/1996 |
| WO | 2001/72501 | 10/2001 |
| WO | 2011/086450 | 7/2011 |

OTHER PUBLICATIONS

Dendurkuri et al., Continuous-flow lithography for high-throughput microparticle synthesis. Nature Materials, vol. 5, pp. 365-369, May 2006, published online Apr. 9, 2006.
Dendukuri et al., Stop-flow lithography in a microfluidic device, Lab Chip, 2007, 7, 818-828, published online May 21, 2007.
Dendurkuri et al., Modeling of Oxygen-Inhibited Free Radical Photopolymerization in PDMS Microfluidic Device, Macromolecules, 2008, 41 (22), 8547-8556, published Oct. 21, 2008.
Yasuda et al., Permeability of Polymer Membranes to Dissolved Oxygen, pp. 1314-1316 (1966) Journal of Polymer Science, vol. 4.
Stern, S.A., The 'Barrer'Permeability Unit, pp. 1933-1934 (1968) Journal of Polymer Science, Part A-2, vol. 6.
Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.
Y. Pan et al., J. Manufacturing Sci. and Eng. 134, 051011-1 (Oct. 2012).
J. Tumbleston et al., Continuous liquid interface production of 3d objects, Science 347, 1349-1352 (published online Mar. 16, 2015).
Park et al., UV- and thermal-curing behaviors or dual-curable adhesives based on epoxy acrylate oligomers, International Journal of Adhesion and Adhesives, vol. 29, Issue 7, 2009, pp. 710-717.
International Search Report and Written Opinion for PCT/US2017/063626 dated Mar. 13, 2018, 21 pages.

* cited by examiner

METHODS AND APPARATUS FOR WASHING OBJECTS PRODUCED BY STEREOLITHOGRAPHY

This application is a 35 U.S.C. § 371 national phase entry of International Application No. PCT/US2017/063626, filed Nov. 29, 2017, which claims the benefit of U.S. provisional patent application Ser. No. 62/434,043, filed Dec. 14, 2016, and U.S. provisional patent application Ser. No. 62/471,094, filed Mar. 14, 2017, the disclosures of which are incorporated by reference herein in their entireties.

FIELD OF THE INVENTION

The present invention concerns additive manufacturing, and particularly concerns methods, apparatus, and systems for washing objects made by additive manufacturing.

BACKGROUND OF THE INVENTION

The production of three-dimensional objects from polymerizable resins by stereolithography has been known for some time (see, e.g., U.S. Pat. No. 5,236,637 to Hull). Unfortunately, such techniques have been generally considered slow, and are typically limited to resins that produce brittle or fragile objects suitable only as prototypes. A more recent technique known as continuous liquid interface production (CLIP) allows more rapid production of objects by stereolithography (see, e.g., U.S. Pat. No. 9,205,601 to DeSimone et al.), and the recent introduction of a variety of different dual cure resins for stereolithography (particularly CLIP) makes possible the production of a much greater variety of functional, useful objects with diverse material properties (see, e.g., U.S. Pat. No. 9,453,142 to Rolland et al.). Together, these developments open the door to the stereolithographic production of a larger number of objects with more diverse properties.

Objects produced by stereolithography are typically coated with viscous residual resin, which must be cleaned from the surface thereof before use. While numerous methods and apparatus for cleaning such objects are known (see, e.g., U.S. Pat. Nos. 5,248,456; 5,482,659, 6,660,208; 6,996,245; and 8,529,703), they are not adapted to cleaning larger numbers of more diverse parts having much more diverse material properties. Accordingly, there is a need for new methods and apparatus for washing objects produced by stereolithography.

SUMMARY OF THE INVENTION

A first aspect of the invention is a method of making a three-dimensional object from a polymerizable resin. The method includes the steps of: (a) providing a carrier platform on which the three-dimensional object can be formed; (b) producing the three-dimensional object adhered to the carrier platform from the polymerizable resin by stereolithography, the object having residual resin on the surface thereof; (c) immersing the object in a wash liquid with the object remaining adhered to the carrier platform; (d) agitating: (i) the object in the wash liquid (e.g., by spinning), (ii) the wash liquid with the object immersed therein (e.g., by sonication of the wash liquid), or (iii) both the object in the wash liquid and the wash liquid with the object immersed therein, to at least partially remove residual resin from the surface of the object; (e) separating the object from the wash liquid (for example, by draining the wash liquid), with the object remaining adhered to the carrier platform, the object having residual wash liquid on the surface thereof; (f) agitating the object (e.g., by spinning, optionally but preferably at a more rapid speed than the spinning of step (d)) to at least partially remove residual wash liquid from the surface thereof; and (g) repeating steps (c) through (f) at least once to remove additional polymerizable resin from the surface thereof, wherein steps (c) through (f) are carried out in the same vessel, the immersing step (c) comprises filling the vessel with the wash liquid, and the separating step (e) comprises draining the wash liquid from the vessel.

A further aspect of the invention is a method of making a three-dimensional object from a polymerizable resin, which is similar to the foregoing, but different in some respects. This method includes the steps of: (a) providing a carrier platform on which the three-dimensional object can be formed; (b) producing the three-dimensional object adhered to the carrier platform from the polymerizable resin by stereolithography, the object having residual resin on the surface thereof; and also generating wash cycle parameters, and optionally also dry cycle parameters (for example, by selecting wash and optionally dry cycle parameters, such as from a plurality of predetermined distinct wash, and optionally dry, cycle parameters), for the object in the wash liquid, wherein at least one parameter of the wash cycle, and the dry cycle when present, is modified (for example, as compared to the parameters of other members of a set of distinct wash, and optionally dry cycle parameters, e.g., gentle, moderate, and vigorous) based on (i) at least one characteristic of the object configuration, (ii) at least one characteristic of the polymerizable resin, (iii) the orientation of the object on the carrier platform, or (iv) a combination thereof; (c) immersing the object in a wash liquid with the object remaining adhered to the carrier platform; (d) agitating, according to the wash cycle parameters, (i) the object in the wash liquid (e.g., by spinning the object), (ii) the wash liquid with the object immersed therein (e.g., by sonication of the wash liquid), or (iii) both the object in the wash liquid and the wash liquid with the object immersed therein, to at least partially remove residual resin from the surface of the object; (e) separating the object from the wash liquid (for example, by draining the wash liquid), with the object remaining adhered to the carrier platform, the object having residual wash liquid on the surface thereof; (f) optionally agitating (e.g., by spinning, optionally but preferably at a more rapid speed than the spinning of step (d)), according to the dry cycle parameters, the object to at least partially remove residual wash liquid from the surface thereof; and (g) optionally repeating steps (c) through (f) at least once to remove additional polymerizable resin from the surface thereof (for example, with the optionally repeating step determined in combination with, or in accordance with, the step of generating or selecting wash, and optionally dry, cycle parameters).

A further aspect of the invention is an apparatus useful for washing residual resin from the surface of an object produced by stereolithography, which object is adhered to a carrier platform. The apparatus includes: (a) a wash vessel configured to receive the object adhered to the carrier platform; (b) a reservoir positioned below the wash vessel and configured to contain at least sufficient wash liquid to fill the wash vessel; (c) a drain line connecting the wash vessel to the reservoir, the drain line optionally having a valve operatively associated therewith; (d) optionally, a fill line connecting the reservoir to the wash vessel, the fill line having a pump operatively associated therewith; (e) an object agitator on which the carrier platform can be mounted, the object agitator having an agitator drive operatively associated therewith; and (f) an elevator operatively associated with the agitator and configured to lower the carrier platform into the wash vessel, the elevator having an elevator drive operatively associated therewith.

A further aspect of the invention is an additive manufacturing system. The system includes: (a) a carrier platform on which an object may be produced by stereolithography, the carrier platform including a unique identifier thereon; (b) a stereolithography apparatus, the apparatus configured to releasably secure the carrier platform for producing an object thereon, the apparatus including a unique identifier reader; (c) a wash apparatus (e.g., an apparatus as described herein), the wash apparatus configured to releasably secure the carrier platform for washing an object produced thereon, the wash apparatus including a unique identifier reader. In some embodiments, the system is configured to execute a plurality of different wash cycles or programs (e.g., a method as described herein). In some embodiments, the system includes (d) a memory operatively associated with the stereolithography apparatus and the wash apparatus and configured to store object information from the stereolithography apparatus from which a wash cycle in the wash apparatus is selected.

Further aspects of the present invention are explained in greater detail in the drawings herein and the specification below. The disclosures of all United States patent references cited herein are to be incorporated herein by reference in their entirety.

DETAILED DESCRIPTION OF ILLUSTRATIVE EMBODIMENTS

Figure 1A:
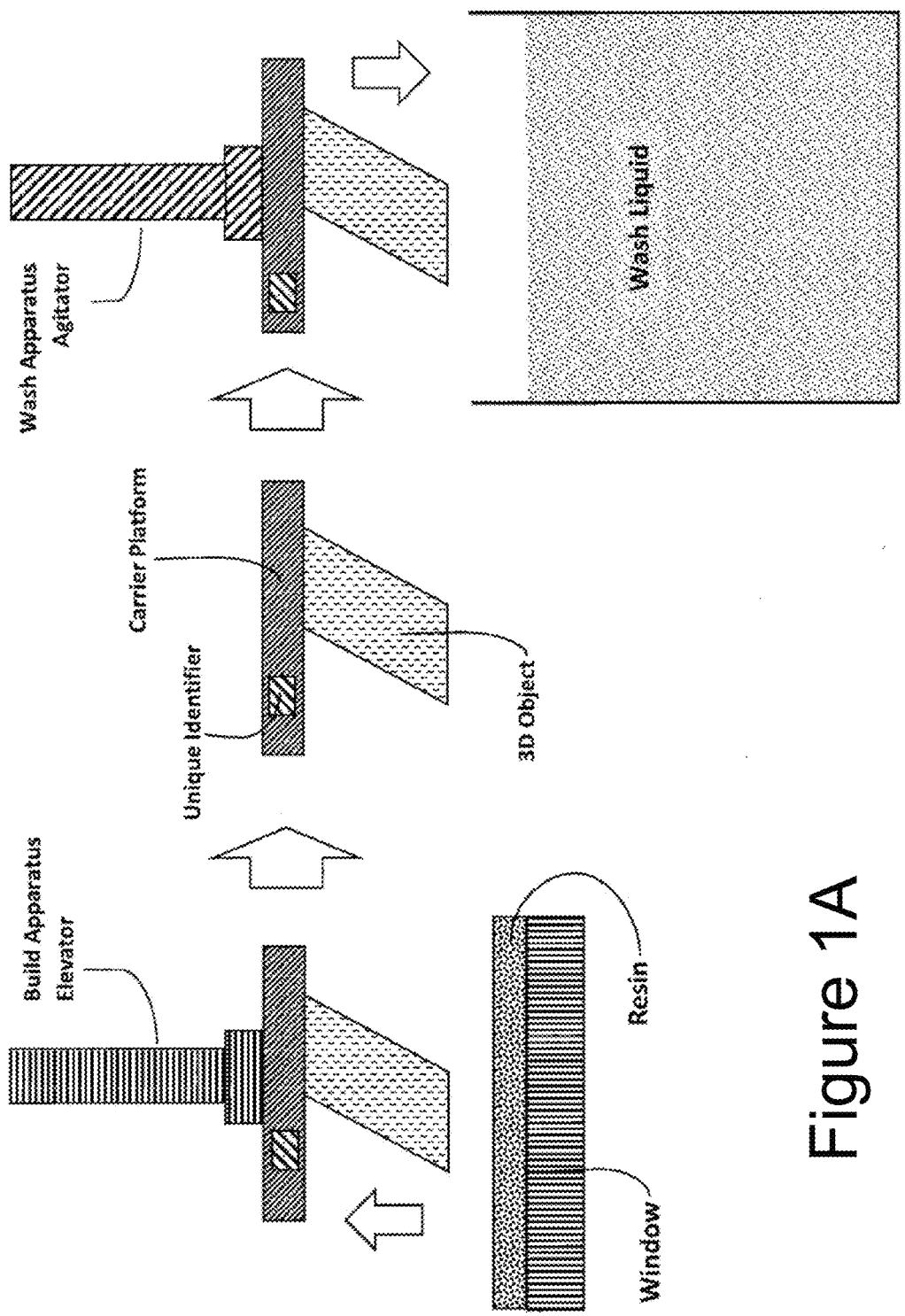
FIGS. 1A-B schematically illustrates a method of the present invention employing both wash and dry (or drain) cycles, with the object remaining on the carrier platform on which it was stereolithographically produced.
Figure 1B:
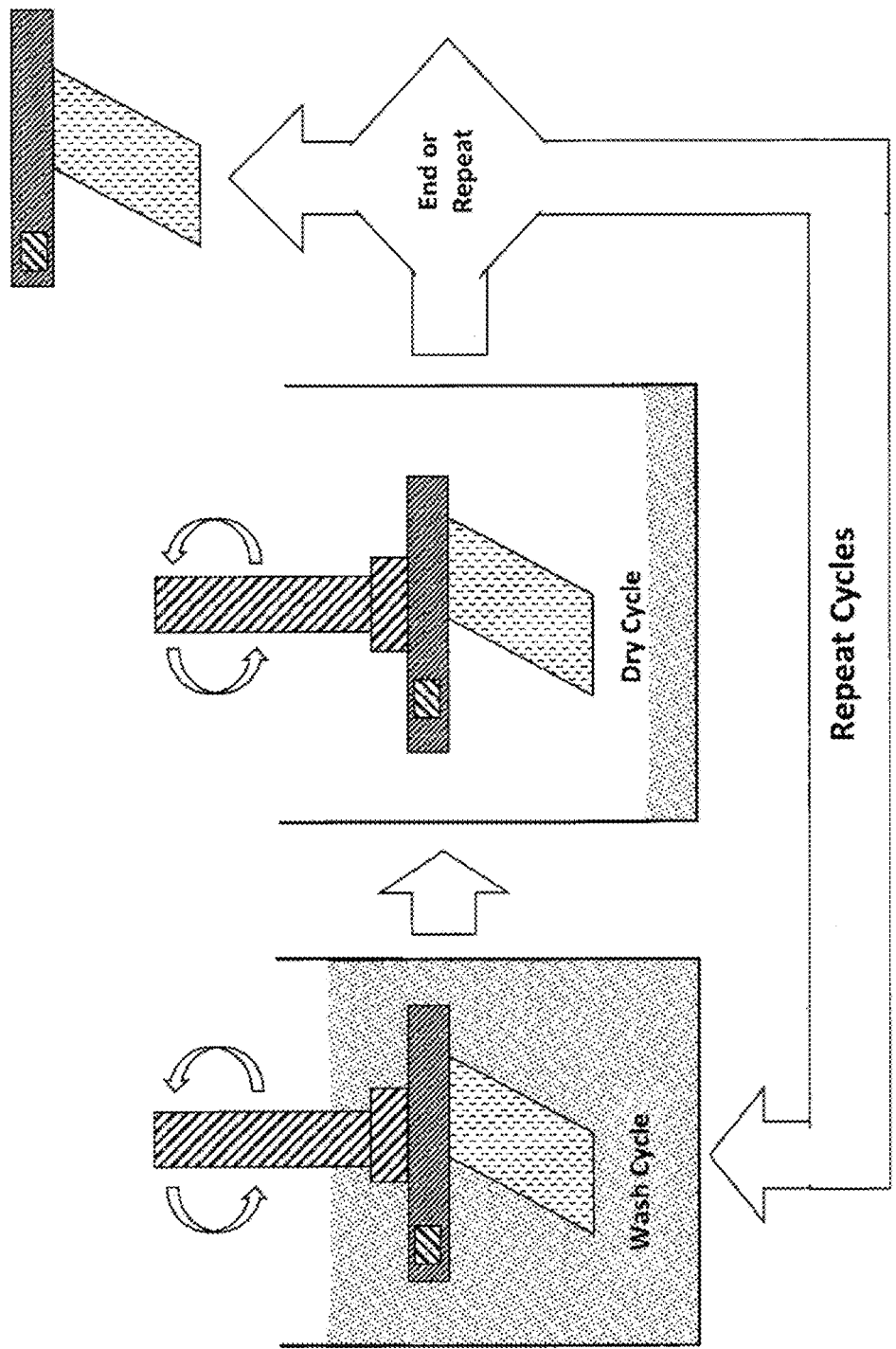

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

"Unique identifier" and "identifier reader" as used herein refer to components of an automatic identification and data capture system. Suitable unique identifiers include, but are not limited to, bar codes (including one-dimensional and two-dimensional bar codes), near field communication (NFC) tags, radio frequency identification (RFID) tags (including active, passive, and battery-assisted passive RFID tags), optical character recognition (OCR) tags and readers, magnetic strips and readers, etc.

1. Production of Objects for Washing.

The three-dimensional intermediate to be washed is preferably formed from polymerizable resins by additive manufacturing, typically bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication No. 2013/0292862 to Joyce, and US Patent Application Publication No. 2013/0295212 to Chen et al. The disclosures of these patents and applications are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three-dimensional intermediate is formed, analogous to the build surface in bottom-up three-dimensional fabrication as discussed below.

In general, bottom-up three-dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments of bottom-up or top-down three-dimensional fabrication as implemented in the context of the present invention, the build surface is stationary during the formation of the three-dimensional intermediate; in other embodiments of bottom-up three-dimensional fabrication as implemented in the context of the present invention, the build surface is tilted, slid, flexed and/or peeled, and/or otherwise translocated or released from the growing three-dimensional intermediate, usually repeatedly, during formation of the three-dimensional intermediate.

In some embodiments of bottom-up or top-down three-dimensional fabrication as carried out in the context of the present invention, the polymerizable liquid (or resin) is maintained in liquid contact with both the growing three dimensional intermediate and the build surface during both the filling and irradiating steps, during fabrication of some of, a major portion of, or all of the three-dimensional intermediate.

In some embodiments of bottom-up or top-down three-dimensional fabrication as carried out in the context of the present invention, the growing three-dimensional intermediate is fabricated in a layerless manner (e.g., through multiple exposures or "slices" of patterned actinic radiation or light) during at least a portion of the formation of the three-dimensional intermediate.

In some embodiments of bottom-up or top-down three-dimensional fabrication as carried out in the context of the present invention, the growing three-dimensional intermediate is fabricated in a layer-by-layer manner (e.g., through multiple exposures or "slices" of patterned actinic radiation or light), during at least a portion of the formation of the three-dimensional intermediate.

In some embodiments of bottom-up or top-down three-dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top-down three-dimensional fabrication as carried out in the context of the present invention, the growing three-dimensional intermediate is fabricated in a layerless manner during the formation of at least one portion thereof, and that same growing three-dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In some embodiments, the intermediate is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In some embodiments, the intermediate object is formed from a dual cure stereolithography resin. Such resins are described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also U.S. Pat. No. 9,453,142).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, Calif. 94063 USA.

In general, objects formed by resins as described above have residual, unpolymerized or partially polymerized, resin on the surface thereof, which must be cleaned or washed from the object, as described further below.

2. Wash Liquids.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof. Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoracetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206.

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluorether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluorether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

3. Methods and Apparatus.

Figure 4:
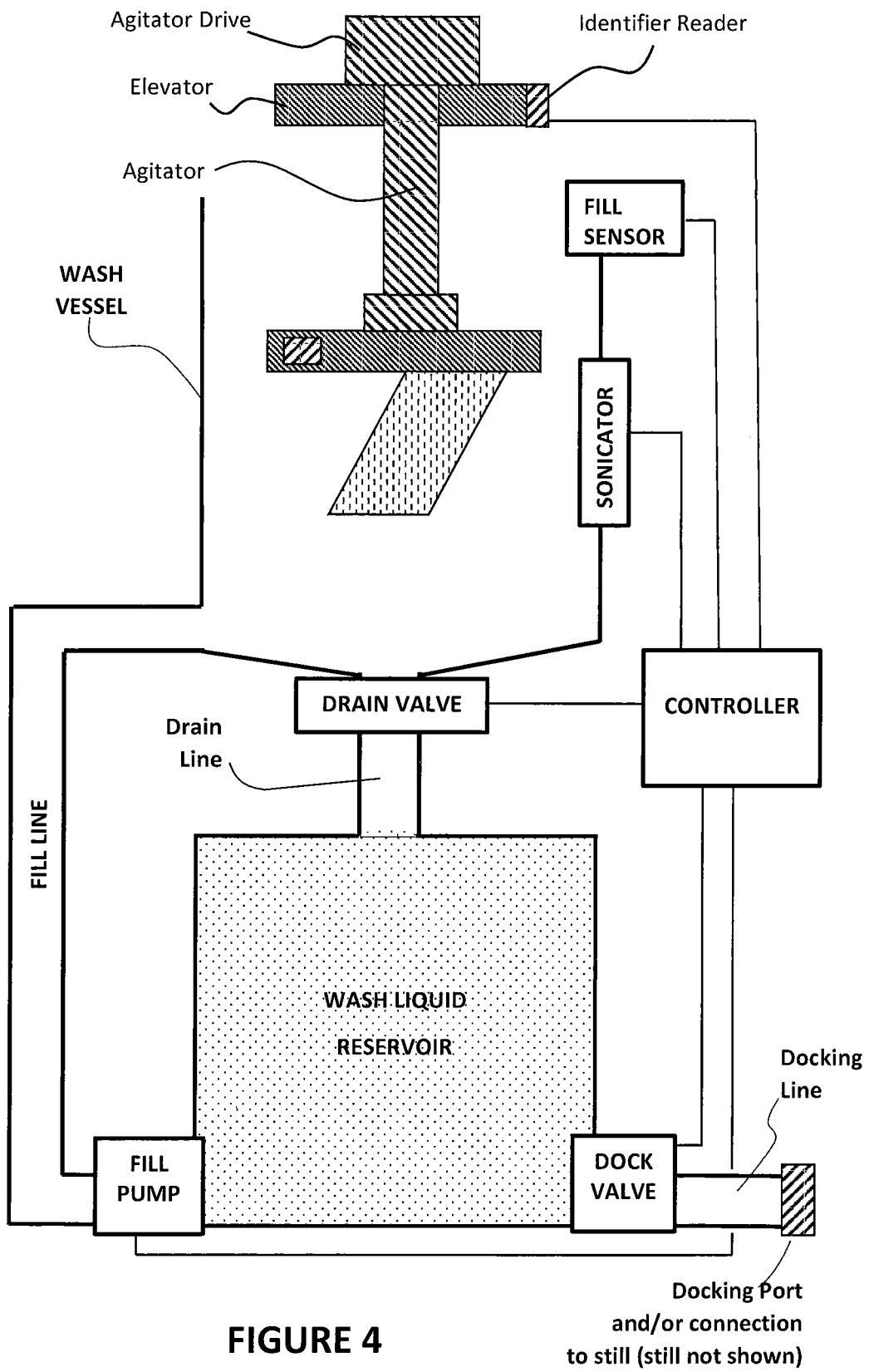
FIG. 4 schematically illustrates a first embodiment of an apparatus of the present invention.
Figure 5:
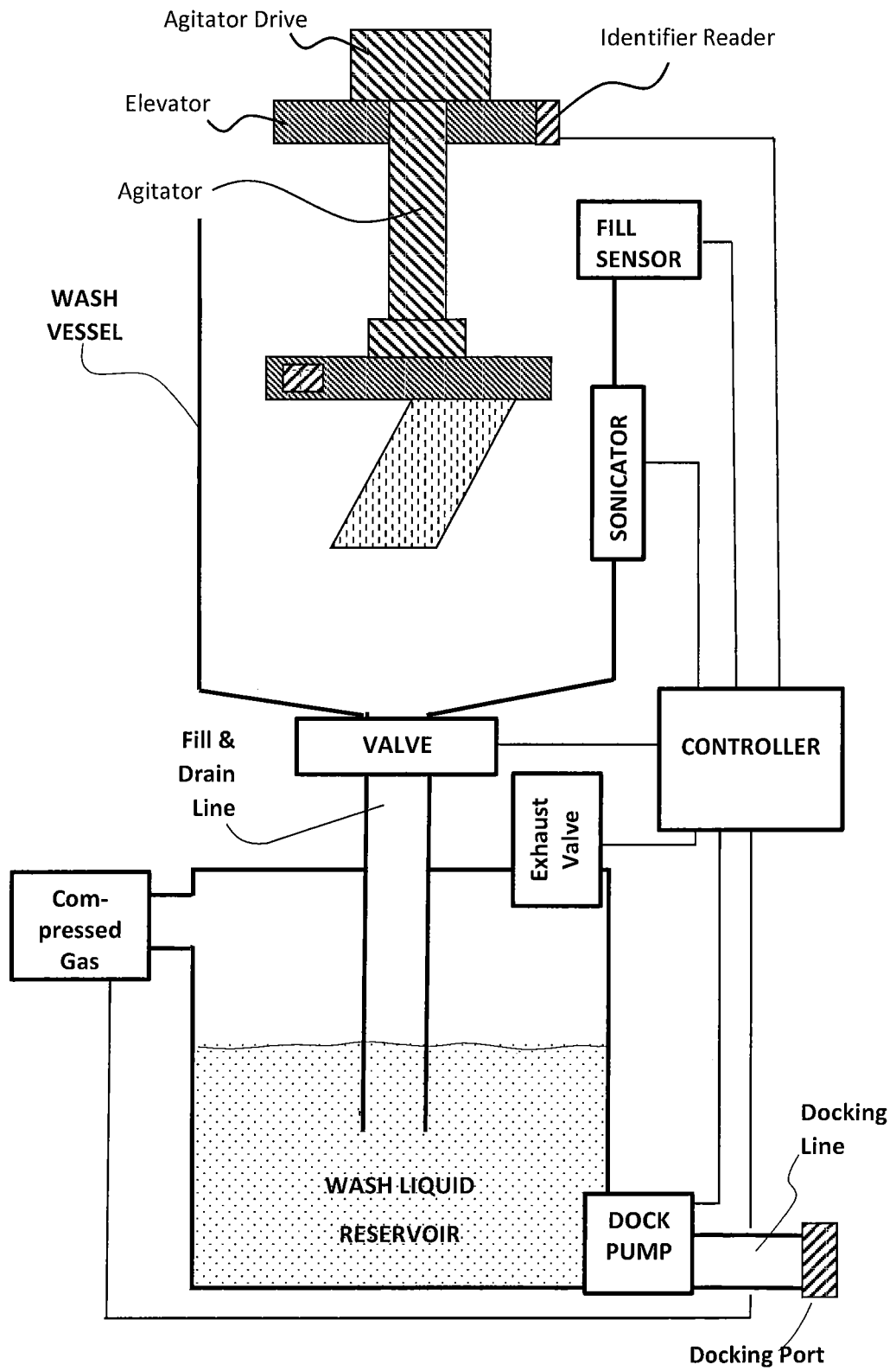
FIG. 5 schematically illustrates a second embodiment of a wash apparatus of the present invention.

Methods of carrying out the present invention are schematically illustrated in FIGS. 1, 2, 3A, and 3B. Non-limiting example of apparatus useful for carrying out the methods described herein are schematically illustrated in FIGS. 4-5. The apparatus generally includes: (a) a wash vessel configured to receive the object adhered to the carrier platform; (b) a reservoir positioned below the wash vessel and configured to contain at least sufficient wash liquid to fill the wash vessel; (c) a drain line connecting the wash vessel to the reservoir, the drain line optionally but preferably having a valve operatively associated therewith; (d) optionally, a fill line connecting the reservoir to the wash vessel, the fill line having a pump operatively associated therewith; (e) an object agitator (e.g., a rotor) on which the carrier platform can be mounted, the object agitator having an agitator drive operatively associated therewith; (f) an elevator operatively associated with the agitator and configured to lower the carrier platform into the wash vessel, the elevator having an elevator drive operatively associated therewith; and (g) a controller operatively associated with the valve, the pump, the agitator drive, and the elevator drive.

The apparatus of FIG. 5 differs from that of FIG. 4 in that it utilizes a pneumatic refill system (e.g., an air compressor and/or a compressed air vessel, or other source of compressed gas, operatively associated with a valve), rather than a separate pump and fill line for refilling the wash vessel. In the apparatus of FIG. 5, note that the drain line is configured (e.g., by extending down close to the bottom of the reservoir) to fill the wash vessel with wash liquid through the drain line when the pneumatic pressure supply is activated. In this case, the drain valve may be optional (as pneumatic pressure in the reservoir may be sufficient to hold the wash liquid in the wash vessel), although in some embodiments inclusion of a drain valve is still preferred. Compressed air is currently preferred as the compressed gas. Once the wash vessel is re-filled, the drain valve may be closed, and compressed gas vented (typically through a commercial exhaust system) by opening an exhaust valve. For the next drain step, the exhaust valve may be left open, so that increasing pressure within the reservoir as it fills with wash liquid vessel does not slow the draining step.

With either the configuration of FIG. 4 or FIG. 5, pumps, valves, pneumatic pressure actuators, and the like can be configured, taking into account the volume of wash liquid to be transferred, so that washing is rapid: For example, so that steps (c) through (f) as described above and below (examples illustrated in FIG. 3A-B) are carried out in a total time of not more than 1, 2, 5 or 10 minutes.

Figure 2:
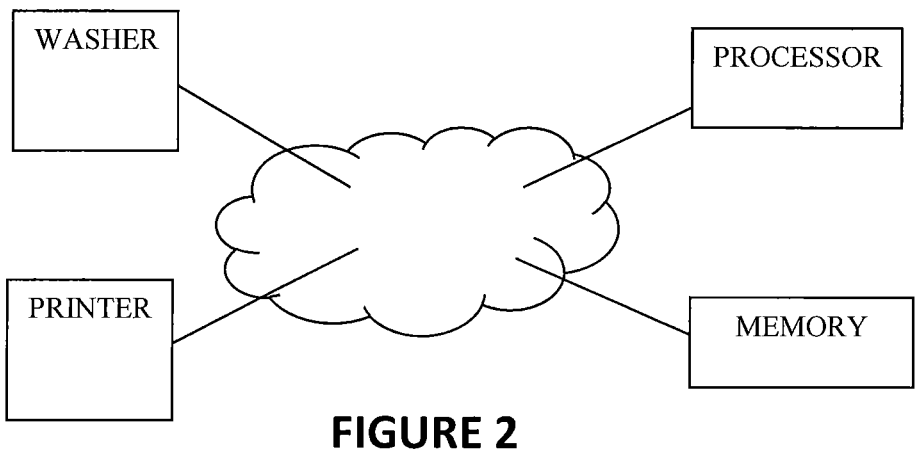
FIG. 2 illustrates a system of the invention comprising an additive manufacturing machine and a washer.
Figure 3A:
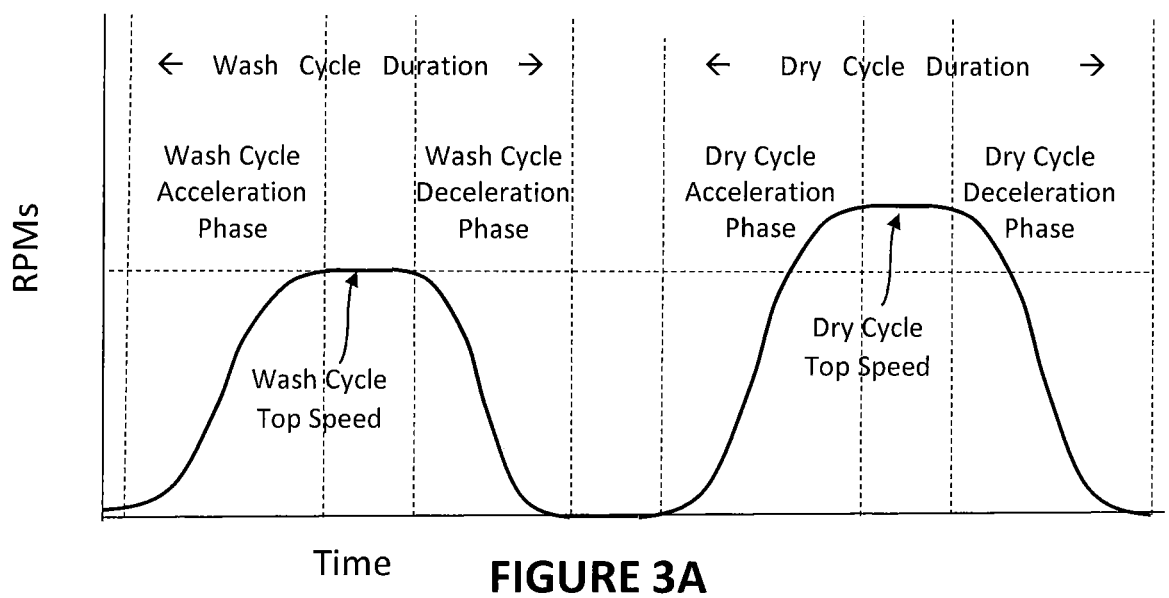
FIG. 3A schematically illustrates a first embodiment of wash and dry cycles of the present invention.
Figure 3B:
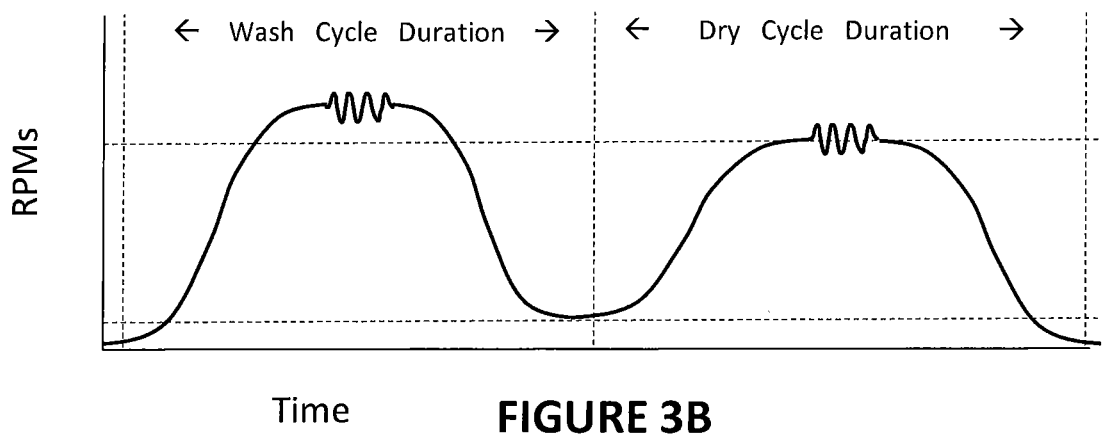
FIG. 3B schematically illustrates a second embodiment of wash and dry cycles of the present invention.

In some embodiments, the apparatus includes an identifier reader (e.g., an NFC tag reader, an RFID tag reader or a bar code reader) operatively associated with the controller, and configured to receive information from each object to be washed as identified by a unique identifier associated with each carrier platform to which each object is adhered. In this case a unique identifier reader may also be included on the stereolithography apparatus, so that information on the object made can be stored into memory and transferred to an associated wash apparatus upon recognition of the platform on which the object was made by a wash apparatus (e.g., through a local network or a cloud-based system, such as illustrated in FIG. 2). Controllers (e.g., software running on a general purpose computer, with appropriate interfaces) may be physically located on either or both machines, on a separate control station, or a combination thereof.

In some embodiments, the controller includes a usage monitor configured to accumulate wash liquid contamination data based on a plurality of objects washed separately in the wash liquid, as each member of the plurality is identified by each unique identifier associated with each carrier platform on which each object is adhered. For example, the usage monitor may simply count the number of times a wash cycle has been implemented with a particular batch of wash liquid, may include information on the particular resin or polymerizable liquid from which each part was made (for example, adjusting the number of permitted wash cycles downwards when use of a resin particularly prone to soiling the wash liquid is used), adjust the number of permitted wash cycles based on information transferred to memory about the particular object(s) being made and washed (for example, adjusting the number of permitted wash cycles downwards when large or high surface-area parts are produced), etc. The usage monitor may be operatively associated with a display indicating remaining numbers of washes available before the wash liquid should be changed, a warning light and/or sound, a lock-out mechanism (whereby the washing machine becomes inoperable if the wash liquid is not changed), etc., including combinations thereof.

In some embodiments, the controller includes a wash cycle parameter generator configured to generate a wash cycle for an object based on data for that object, as that object is identified by the unique identifier associated with the carrier platform on which that object is adhered (see further discussion below).

In some embodiments, the apparatus further includes a liquid agitator (e.g., a sonicator) operatively associated with the wash vessel and the controller. This may be selectively activated (alone or in combination with other forms of agitation such as spinning) to provide a more gentle form of agitation when required for particular part geometries, or where parts may include deep cavities that might not otherwise be reached by a spinning form of agitation.

In some embodiments, the apparatus further includes a fill sensor operatively associated with the wash vessel and the controller.

In some embodiments, the apparatus further includes a docking line connected to the reservoir, the docking line having a docking valve operatively associated therewith, the docking valve also operatively associated with the controller; and/or a distillation apparatus operatively connected to the reservoir, optionally with the distillation apparatus operatively connected to the controller.

As noted above, an aspect of the invention is a method of making a three-dimensional object from a polymerizable resin. The method includes the steps of:
(a) providing a carrier platform on which the three-dimensional object can be formed;
(b) producing the three-dimensional object adhered to the carrier platform from the polymerizable resin by stereolithography, the object having residual resin on the surface thereof;
(c) immersing the object in a wash liquid with the object remaining adhered to the carrier platform;
(d) agitating (i) the object in the wash liquid (e.g., by spinning), (ii) the wash liquid with the object immersed therein (e.g., by sonication of the wash liquid), or (iii) both the object in the wash liquid and the wash liquid with the object immersed therein, to at least partially remove residual resin from the surface of the object;
(e) separating the object from the wash liquid, with the object remaining adhered to the carrier platform, the object having residual wash liquid on the surface thereof;
(f) agitating the object (e.g., by spinning) to at least partially remove residual wash liquid from the surface thereof; and
(g) repeating steps (c) through (f) at least once to remove additional polymerizable resin from the surface thereof, wherein steps (c) through (f) are carried out in the same vessel, the immersing step (c) comprises filling the vessel with the wash liquid, and the separating step (e) comprises draining the wash liquid from the vessel.

As also noted above, a further aspect of the invention is a method of making a three-dimensional object from a polymerizable resin, which is similar to the foregoing, but different in some respects. The method includes the steps of:
(a) providing a carrier platform on which the three-dimensional object can be formed;
(b) producing the three-dimensional object adhered to the carrier platform from the polymerizable resin by stereolithography, the object having residual resin on the surface thereof; and also
generating or selecting wash cycle parameters, and optionally also dry cycle parameters, for the object in the wash liquid, wherein at least one parameter of the wash cycle, and the dry cycle when present, is modified or selected based on (i) at least one characteristic of the object configuration, (ii) at least one characteristic of the polymerizable resin, (iii) the orientation of the object on the carrier platform, or (iv) a combination thereof;
(c) immersing the object in a wash liquid with the object remaining adhered to the carrier platform;
(d) agitating, according to the wash cycle parameters, (i) the object in the wash liquid (e.g., by spinning the object), (ii) the wash liquid with the object immersed therein (e.g., by sonication of the wash liquid), or (iii) both the object in the wash liquid and the wash liquid with the object immersed therein, to at least partially remove residual resin from the surface of the object;

(e) separating the object from the wash liquid, with the object remaining adhered to the carrier platform, the object having residual wash liquid on the surface thereof;

(f) optionally agitating (e.g., by spinning), according to the dry cycle parameters, the object to at least partially remove residual wash liquid from the surface thereof; and (g) optionally repeating steps (c) through (f) at least once to remove additional polymerizable resin from the surface thereof (e.g., in accordance with the step of generating or selecting wash cycle parameters, and optionally also dry cycle parameters).

In some embodiments of both of the foregoing, steps (c) through (f) are carried out in the same vessel, the immersing step (c) comprises filling the vessel with the wash liquid, and the separating step (e) comprises draining the wash liquid from the vessel.

In some embodiments of both of the foregoing, the agitating step (d) and the (optionally) agitating step (f) are both carried out by spinning the carrier platform with the object remaining adhered thereto.

In some embodiments of both of the foregoing, the wash cycle parameters, and the dry cycle parameters when present, include duration of agitation, maximum speed of agitation, acceleration of agitation, deceleration of agitation, and direction of agitation.

For example: The wash apparatus controller may include overall wash cycles (that is, including number of repeats) of different durations, and/or wherein steps (c) through (f) are repeated (e.g., once or twice) or not, with the decision on whether to repeat based on the type of resin from which the object is made (objects made form hard-to-clean resins being subjected to multiple, or longer, cleaning cycles). The controller may include wash cycles with different speeds of rotation, where objects that are highly asymmetric (e.g., "off balance loads") are rotated at a lower speed during the agitating steps, and/or where ultrasonic agitation is implemented. The controller may include cycles in which spin agitation can be selectively imparted in different directions (e.g., clockwise or counter-clockwise), depending on which direction may be more dynamically stable, or impart greater turbulence, based on the shape of the part (with greater turbulence being preferred by structurally strong objects, but less preferred for delicate objects). In one particular, non-limiting, example, the wash apparatus may be configured to carry out: (1) a "gentle" overall wash cycle (or "wash program"), e.g., of two to four sequential cycles, with a top agitation speed of 10 revolutions per minute (RPMs) for each wash step and 30 RPMs for each drain step, carried out over a total of five to ten minutes; (2) a "moderate" wash program, e.g., of two to four sequential cycles, with a top agitation speed of 30 revolutions per minute (RPMs) for each wash step and 300 RPMs for each drain step, with all cycles completed in a total of five to ten minutes; and (3) a "vigorous" wash program, e.g., of two to four sequential cycles, with a top agitation speed of 100 revolutions per minute (RPMs) for each wash step and 1,000 RPMs for each drain step, carried out over a total time of five to ten minutes. Additional options can be included, and the speeds above can be varied. Indeed, numerous different wash programs will be readily recognized by those skilled in the art. Where the washer reads a unique identifier for an object produced with a resin having a low pre-bake, or "green" strength, such as some cyanate ester or elastomeric polyurethane resins, then the washer can be configured to select and carry out a gentle wash program. Where the washer reads a unique identifier for an object produced with a resin having a stronger green strength, such as some urethane methacrylate resins, then the washer can be configured to select and carry out a vigorous wash program. Where the washer reads a unique identifier for a part that includes delicate or fragile features, and/or is highly asymmetric or off balance for a spin cycle, then the washer can be configured to select and carry out a less vigorous wash program than might otherwise be carried out. Note that assigning of a particular wash program to a particular part can occur at any time, such as when the part is formed, or when the part is planned (e.g., resin matched to geometric configuration), and the generating step may simply involve retrieving and executing that previously selected wash program. And, the wash program(s) can optionally be modified uniquely to each part's geometry, based on predictive programs and/or a database of actual part washing experience.

In some embodiments of both of the foregoing, the object and the carrier platform together have both a center of mass and an axis of rotation, and wherein the center of mass is either aligned with or offset from the axis of rotation.

In some embodiments of both of the foregoing, the residual resin has a boiling point of at least 90 or 100° C. (e.g., up to 250 or 300° C., or more), and the wash liquid has a boiling point of from 30° C. to 80 or 90° C.

In some embodiments of both of the forgoing, the wash liquid comprises an organic solvent (e.g., a halogenated organic solvent, such as a fluorinated organic solvent, or a siloxane solvent).

In some embodiments of both of the foregoing, the organic solvent comprises an azeotropic mixture comprised of at least a first organic solvent (e.g., a hydrofluorocarbon solvent, a hydrochlorofluorocarbon solvent, a hydrofluoroether solvent, a methylsiloxane solvent, or combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight).

In some embodiments of both of the foregoing, the carrier platform comprises a unique identifier (e.g., a bar code, NFC tag or RFID tag), and the generating step is carried out with information associated with the unique identifier.

Transfer of the carrier platform from the addive manufacturing apparatus to the wash apparatus may be carried out manually, robotically, or combinations thereof. Systems for robotic transfer can be implemented in accordance with known techniques employed in robotic manufacturing systems, or variations thereof that will be apparent to those skilled in the art. See, e.g., U.S. Pat. Nos. 6,627,016; 6,694,224; 7,146,705; 8,651,160; 8,668,423; and 9,351,569.

4. Recycling of Wash Liquid.

When the wash liquid has become sufficiently contaminated with residual resin to unduly interfere with the washing of new objects, then the apparatus may be docked to a distillation apparatus through the docking port, the docking valve opened and the wash liquid drained into a separation apparatus (e.g., a distillation apparatus), and the wash liquid distilled to separate it from residual resin and generate cleaned wash liquid, and the cleaned wash liquid pumped back into the reservoir. Operations may be reversed with the wash liquid pumped from the reservoir and drained from the distillation apparatus back into the reservoir, the wash liquid may be pumped both ways, etc. Numerous configurations of a distillation apparatus can be used, including but not limited to those described in U.S. Pat. No. 3,661,721 to Rodgers; U.S. Pat. No. 4,622,102 to Diebel; U.S. Pat. No. 4,734,167 to Goeldner; U.S. Pat. No. 5,951,825 to Land; U.S. Pat. No. 6,830,661 to Land; and variations of the foregoing that will be apparent to those skilled in the art.

In some embodiments, the distillation apparatus may comprise a vacuum distillation apparatus. In some embodiments, the vacuum distillation apparatus further comprises or includes a heater to heat the wash liquid during boiling thereof (albeit at a temperature less than the boiling point under atmospheric pressure). Vacuum distillation is known, and any suitable vacuum distillation apparatus may be used. See, e.g., U.S. Pat. Nos. 1,717,002; 1,852,205; 2,210,927; 3,347,754; 5,955,135; 5,980,695; etc. For example, a solvent (or wash liquid) resistant pump can be used to evacuate vapor from the solvent headspace. The solvent can then be removed, passed over a chiller/heat exchanger, and into a closed vessel at ambient temperature and pressure. Heat can then be added to the still to maintain a sufficiently high temperature to continue boiling the solvent at the lower boiling point. Evaporative cooling may lower the temperature of the boiling vessel and stop the evaporation process, so adding heat to the system may then be necessary.

By employing a vacuum distillation apparatus, the temperature to which the wash liquid is heated above room temperature may be reduced (e.g., not more than 50, 40, 35, or 30 degrees Centigrade), thereby reducing the degradation of residual resin or "bottoms" in the wash liquid to potentially undesirable breakdown products thereof (e.g., reduce the formation of methyl methacrylate/methyl acrylate degradation products).

As noted above, in some embodiments, the controller can include a usage monitor configured to accumulate wash liquid contamination data. When the distiller is integrated to the smart washer it can determine when the soil load of the resin has reached an appropriate level to require distillation. This mode can be activated by the control logic for the smart washer.

Two (or more) separate "batches" of wash liquid may be kept available, with one stored in a secondary storage tank. In this way, when it is time for one wash liquid to be distilled, the soiled wash liquid can be transferred into the still for distillation, and an alternate batch of wash liquid can be transferred into the wash apparatus for use in cleaning objects, while the other batch of wash liquid is being distilled.

The foregoing is illustrative of the present invention, and is not to be construed as limiting thereof. The invention is defined by the following claims, with equivalents of the claims to be included therein.

We claim:

1. An apparatus useful for washing residual resin from the surface of an object produced by stereolithography, the apparatus comprising:
 a carrier platform with said object adhered thereto;
 a wash vessel configured to receive said object adhered to said carrier platform that has been transferred from an additive manufacturing apparatus where said object was produced on said carrier platform;
 a reservoir positioned below said wash vessel and configured to contain at least sufficient wash liquid to fill said wash vessel;
 a drain line connecting said wash vessel to said reservoir, said drain line having a valve operatively associated with said drain line;
 an object agitator on which said carrier platform is mounted, said object agitator having an agitator drive operatively associated therewith;
 an elevator operatively associated with said object agitator and configured to lower said carrier platform into said wash vessel, said elevator having an elevator drive operatively associated with said elevator; and
 a pneumatic pressure supply operatively associated with said reservoir, with said reservoir and said drain line configured to fill said wash vessel with wash liquid through said drain line when said pneumatic pressure supply is activated,
 wherein said wash vessel and said reservoir are in fluid communication only via said drain line.

2. The apparatus of claim 1, further comprising:
 a controller operatively associated with said valve, said agitator drive, and said elevator drive.

3. The apparatus of claim 2, further comprising
 an identifier reader operatively associated with said controller, and configured to receive information from each object to be washed as identified by a unique identifier associated with each carrier platform to which each object is adhered.

4. The apparatus of claim 2, further comprising a liquid agitator operatively associated with said wash vessel and optionally operatively associated with said controller.

5. The apparatus of claim 2, further comprising a fill sensor operatively associated with said wash vessel and optionally operatively associated with said controller.

6. The apparatus of claim 2, further comprising an exhaust valve operatively associated with said reservoir, and optionally with said controller, said exhaust valve configured to be open to the atmosphere during draining of wash liquid from said wash vessel to said reservoir, and closed to the atmosphere during filling of said wash vessel with wash liquid from said reservoir.

7. The apparatus of claim 1, wherein said object agitator comprises a rotor.

8. The apparatus of claim 1, wherein said object extends downwardly from said carrier platform.

* * * * *